(12) United States Patent
Asakura et al.

(10) Patent No.: US 8,364,343 B2
(45) Date of Patent: Jan. 29, 2013

(54) ELECTRONIC MANUAL DISPLAY DEVICE

(75) Inventors: Toshimasa Asakura, Tokyo (JP); Hisashi Kurota, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 12/988,821

(22) PCT Filed: Mar. 30, 2009

(86) PCT No.: PCT/JP2009/001469
§ 371 (c)(1),
(2), (4) Date: Oct. 21, 2010

(87) PCT Pub. No.: WO2009/130852
PCT Pub. Date: Oct. 29, 2009

(65) Prior Publication Data
US 2011/0039236 A1    Feb. 17, 2011

(30) Foreign Application Priority Data

Apr. 22, 2008 (JP) ................................. 2008-111780
Apr. 22, 2008 (JP) ................................. 2008-111783

(51) Int. Cl.
*B09B 9/04* (2006.01)
*B60K 37/00* (2006.01)
(52) U.S. Cl. ................. 701/36; 701/1; 701/533; 434/62
(58) Field of Classification Search ........... 701/36, 701/34.3, 533, 1; 348/383, 148; 345/173, 345/690; 434/62, 365; 715/706; 340/679
See application file for complete search history.

(56) References Cited

U.S. PATENT DOCUMENTS

| | | | |
|---|---|---|---|
| 6,714,846 B2 * | 3/2004 | Trsar et al. | 701/34.3 |
| 7,242,311 B2 * | 7/2007 | Hoff et al. | 340/679 |
| 2002/0103583 A1 * | 8/2002 | Ohmura et al. | 701/33 |
| 2009/0144622 A1 * | 6/2009 | Evans et al. | 715/706 |

FOREIGN PATENT DOCUMENTS

| | | |
|---|---|---|
| JP | 10-274543 | 10/1998 |
| JP | 3629201 | 12/2004 |
| JP | 2007-158792 | 6/2007 |
| JP | 2007-216711 | 8/2007 |
| JP | 2009-514734 | 4/2009 |
| WO | 2007/054284 | 5/2007 |

\* cited by examiner

*Primary Examiner* — Tan Q Nguyen
(74) *Attorney, Agent, or Firm* — Squire Sanders (US) LLP

(57) ABSTRACT

Provided is an electronic manual display device which helps the user understand the positions of and how to operate various switches that the user uses when driving a vehicle. The electronic manual display device is a program-controlled display device for displaying an electronic manual for operating a vehicle. When a button for requiring the explanation of the switches is selected from the menu screen of the electronic manual, the display device reads out a screen for explaining how to operate the switches, which is linked to the selected button, from a storage device, and displays the screen on a display unit. On the screen for explaining how to operate the switches, an illustration for explaining the operation positions of the switches and an illustration for showing the operating state of the vehicle obtained at the said operation positions of the switches are displayed side by side. The illustration for showing the operating state of the vehicle changes instantaneously corresponding to a change in the illustration for explaining the operation positions of the switches.

5 Claims, 5 Drawing Sheets (A)

(B)

(C)

ELECTRONIC MANUAL DISPLAY DEVICE

FIELD OF THE INVENTION

The present invention relates to a display device which displays an electronic manual using an on-vehicle navigation system.

DESCRIPTION OF THE RELATED ART

A manual which explains how to operate each portion configuring a vehicle to the user is attached to the vehicle. The user refers to the table of the contents to search for and browse the page describing a portion of interest. In recent years, as vehicle functions have become more complicated, the number of pages of a manual has increased, with the result that it takes a long time to search for a desired page and that the difficulty of reaching necessary information in search by turning the pages has been experienced.

The present applicant has proposed U.S. Pat. No. 3,629,201 in which an electronic manual is displayed using a monitor screen for map display of an on-vehicle navigation system. The positions of a vehicle and how to operate the portions of the vehicle are displayed by combinations of still images and moving images, thereby enabling the operation explanation to be easily understood. The desired portion can be electronically searched for, which can improve the convenience. According to this method, search is easier than using thick manual books, and the explanation about how to operate the portions of the vehicle can be understood on the screen by illustrations, which can be easily understood by the user.

However, in such screen display, as the desired portion is searched for, with information that the user has previously known such as the name and position of the portion as an index, it is still expected to take a long time for search.

For instance, when an unfamiliar vehicle such as a received new car and other rented cars is used, the positions of and how to operate various switches such as light switches and a wiper switch can be slightly different according to the type of the vehicle so that the user is often confused when understanding the positions of them and how to operate them before the start of driving. Even in such case, display which can be easily understood without confusing the user is desired.

In addition, in the conventional operation explanation, for an actual operation and the operating state of a vehicle obtained by the operation, images are sequentially displayed or the images are displayed along with text. It takes a long time and is not easy to understand the actual operation and the operating state of the vehicle obtained by the operation.
Patent Document 1: U.S. Pat. No. 3,629,201

DISCLOSURE OF THE INVENTION

Problem to be Solved by the Invention

An object of the invention is to provide an electronic manual display device which helps the user understand the positions of and how to operate various switches that the user uses when driving a vehicle in the display of an electronic manual using an on-vehicle navigation system.

SUMMARY OF THE INVENTION

To solve the problem, the invention provides a program-controlled display device for displaying an electronic manual for operating a vehicle using an on-vehicle navigation system having a storage device and a display unit.

The display device is configured that when a button for requiring the explanation of the switches is selected from the menu screen of the electronic manual, the display device reads out a screen for explaining how to operate the switches, which is linked to the selected button, from the storage device, and displays the screen on the display unit, wherein on the screen for explaining how to operate the switches, an illustration for explaining the operation positions of the switches and an illustration for showing the operating state of the vehicle obtained at the operation positions of the switches are displayed side by side, and the illustration for showing the operating state of the vehicle is simultaneously changed to an illustration for showing the operating state of the vehicle obtained at the changed operation positions corresponding to a change in the illustration for explaining the operation positions of the switches.

According to an embodiment of the invention, the screen for explaining how to operate the display device is configured that a plurality of operation positions of each of the switches are sequentially changed and displayed at predetermined time intervals.

According to another embodiment of the invention, on the screen of the display device for explaining how to operate each of the switches, the continuous operation positions of the switches are continuously changed and displayed at short time intervals.

According to another embodiment of the invention, the display unit is a touch panel display unit, and the selection is performed by touching the screen of the display unit.

According to the invention, as how to operate and the operation position of a switch for requiring the operation explanation and the operating state of the vehicle according to the operation of the switch can be displayed side by side on the same screen, the user can understand an actual operation and the operating state of the operation result while comparing them at the same time. In addition, when there are a plurality of operation positions, they can be sequentially changed and displayed at predetermined time intervals, so that a series of operations and the associated operation positions of the switch can be understood more easily. Further, a change in the continuous operation positions can be understood at a glance by continuously changing and displaying them at short time intervals.

Therefore, even when an unfamiliar vehicle such as a new car or a rented car is used, the operations of the switches can be shortly understood.

DESCRIPTION OF THE PREFERRED EMBODIMENTS

Figure 1:
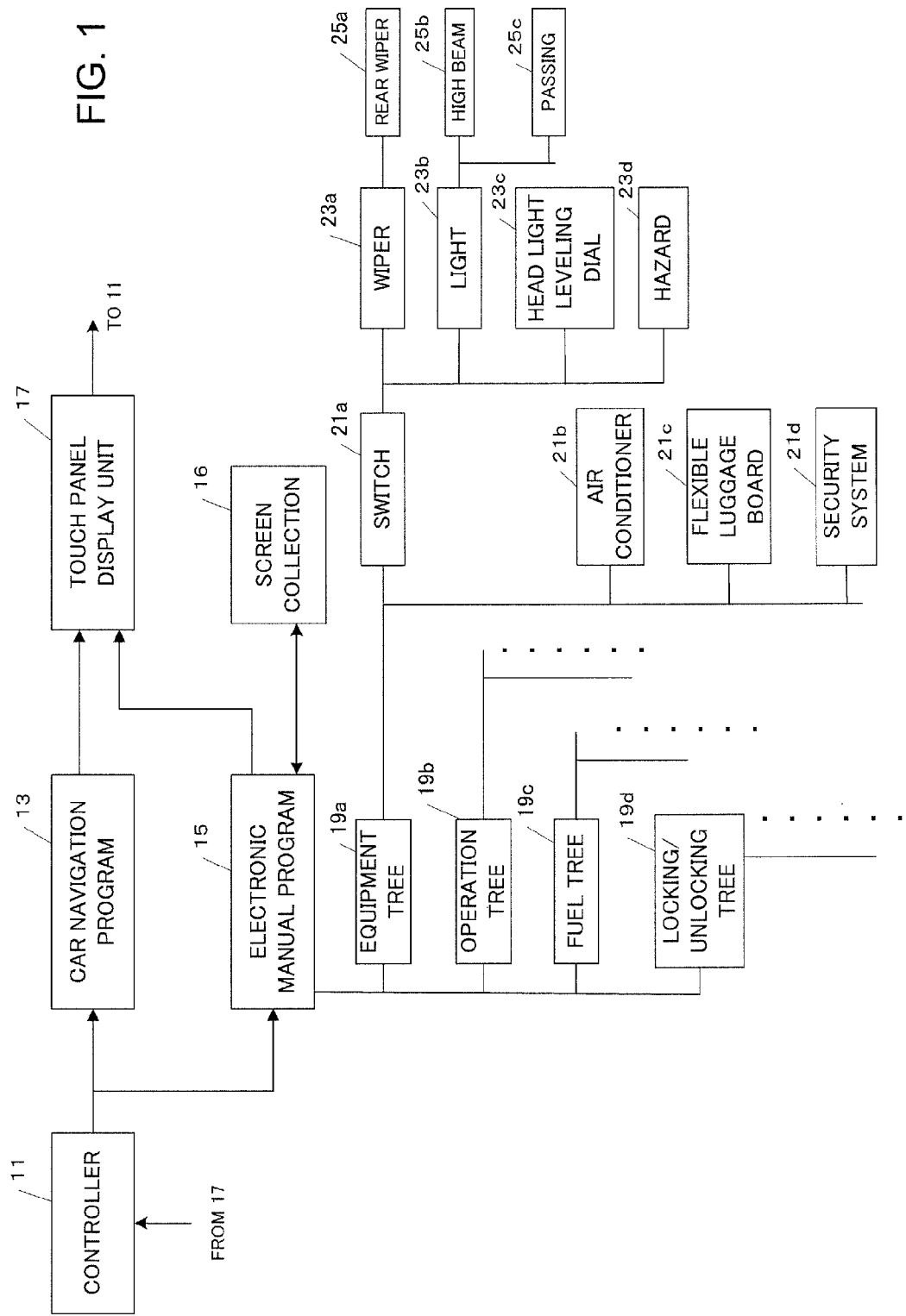
FIG. 1 is a block diagram showing the overall configuration of an electronic manual display device of the invention.

An embodiment of the invention will be described with reference to the drawings. FIG. 1 is a block diagram showing the overall configuration of an embodiment of an electronic manual display device according to the invention. The electronic manual display device is integrated with an on-vehicle navigation system. A controller 11 is a controller of the navigation system, and is a small computer having a microprocessor. The navigation system can have a random access memory (RAM) which provides an operating region to the processor, a read only memory (ROM) storing a control program, and a nonvolatile storage device storing an application program. The storage device may be a hard disk storage device, and may also be a DVD, CD, or SD card. When the DVD, CD, or SD card is used as the storage device, the navigation system is required to have a reading device for the DVD, CD, or SD card.

A car navigation program 13, an electronic manual program 15 and a screen collection 16 of FIG. 1 are stored in the above nonvolatile storage device. In this embodiment, the navigation system has a touch panel display unit 17. Alternatively, the display unit 17 may be a typical liquid crystal display unit without a touch panel function, and may perform input for operation using input buttons provided on the peripheral frame on the screen.

Figure 2:
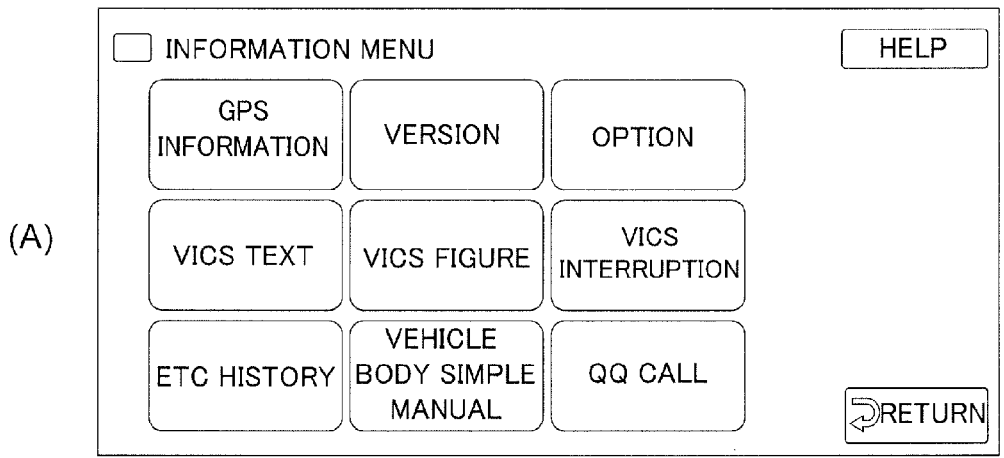
FIGS. 2(A), 2(B), and 2(C) are diagrams showing examples of the screens of a display unit according to an embodiment of the invention.
Figure 2:
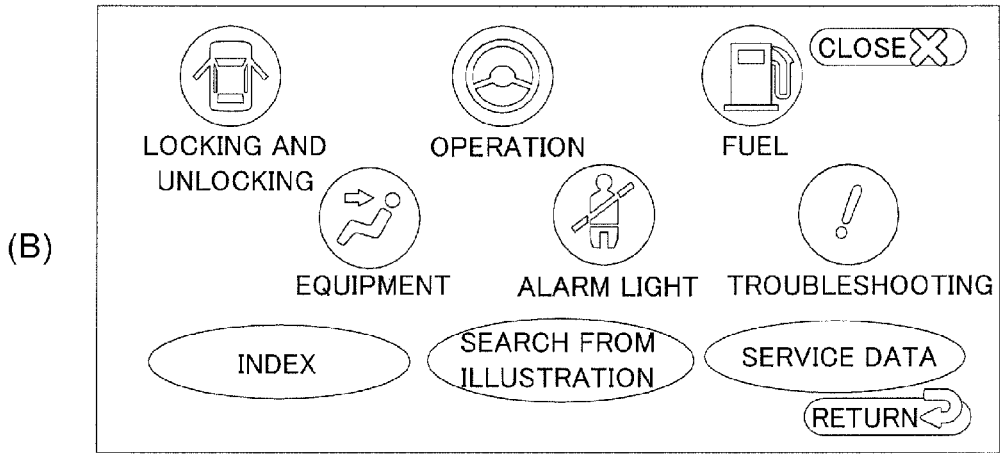
Figure 2:
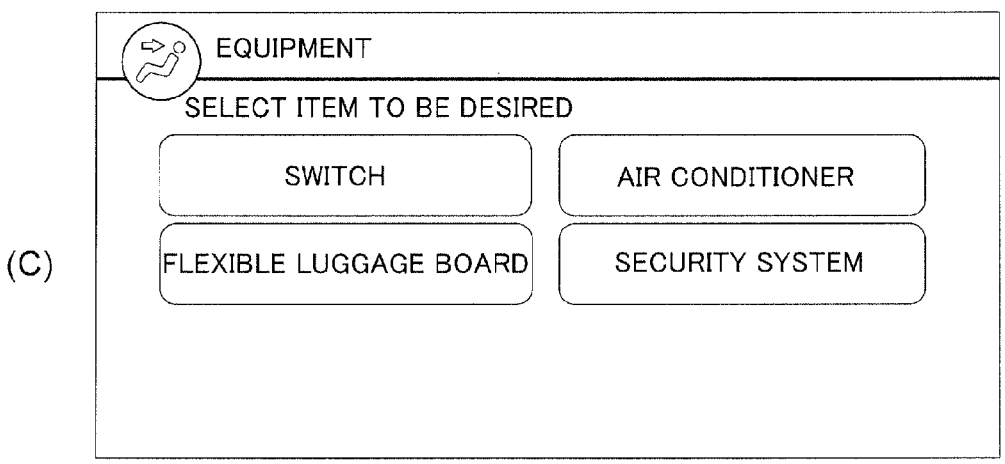

The user can select the desired function from the menu screen of the information menu shown in FIG. 2(A), which is displayed on the display screen of the navigation system. When the selective button of the vehicle body simple manual displayed on the menu screen is selected, the electronic manual program 15 is read from the storage device.

The electronic manual program 15 has tree structures, and includes an equipment tree 19*a*, an operation tree 19*b*, a fuel tree 19*c*, a locking/unlocking tree 19*d*, and other trees. FIG. 2(B) is the first menu screen of the vehicle body simple manual displayed on the display unit 17 after the execution of the electronic manual program 15, which displays the selective buttons of these trees.

Now, when the user touches (=selects) the "equipment" button, a touch signal is transmitted from the display unit 17 to the controller 11. According to the signal, the electronic manual program 15 reads the first menu screen of the tree, which is linked to the "equipment" button, from the screen collection 16, thereby displaying the menu screen on the display unit 17. FIG. 2(C) shows the equipment menu screen displayed on the display unit 17. A first layer of the equipment tree 19*a* includes a switch 21*a*, an air conditioner 21*b*, a flexible luggage board 21*c*, and a security system 21*d*, which are displayed as buttons on the screen, as shown in FIG. 2(C).

Figure 3:
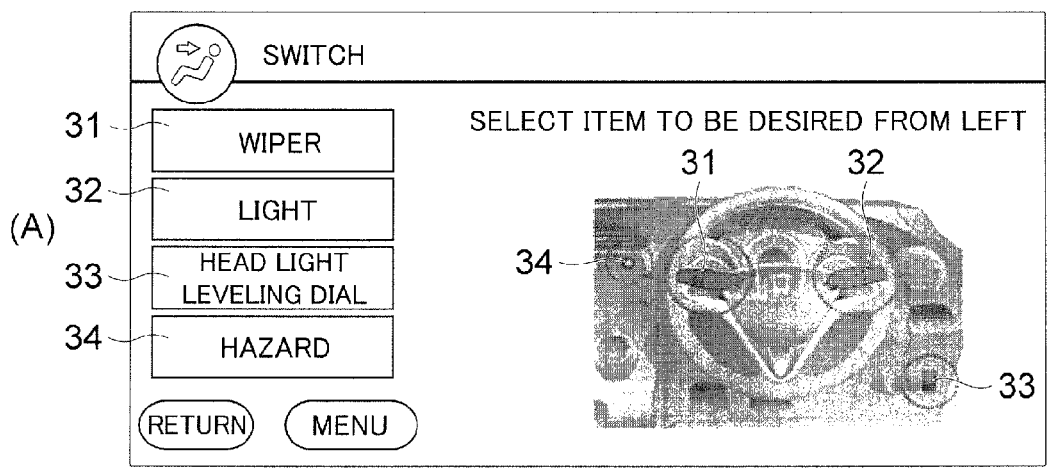
FIGS. 3(A) and 3(B) are diagrams showing examples of the screens of the display unit according to the embodiment of the invention.
Figure 3:
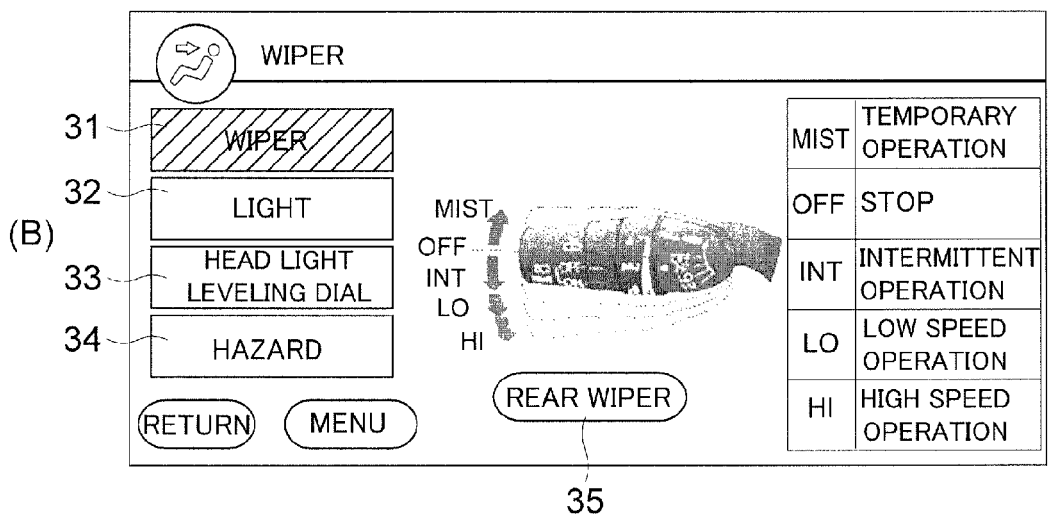

Now, when the user touches the "switch" button on the screen of FIG. 2(C), the image linked to the button is read from the screen collection 16, and is displayed on the display unit 17, as shown in FIG. 3(A).

Referring to FIGS. 3(A) and 1, a second layer of the equipment tree 19*a* includes four switches of a wiper 23*a*, a light 23*b*, a head light leveling dial 23*c*, and a hazard (lamp) 23*d*.

An image portion on the right side of FIG. 3(A) displays an image for including the four switches and showing a visibility region in the vehicle, which is able to see from the driver's seat. In particular, in the image, red circular marks surround the positions of the four switch portions, respectively, and the marks are displayed as operation buttons. In addition, on the left side of the screen shown in FIG. 3(A), texts showing the names of the four switches are aligned and arranged as operation buttons in the same color at the positions which can be easily seen, apart from the image portion on the right side.

Each of the operation buttons for showing the respective names on the left side of FIG. 3(A), which are aligned and arranged by the names of the switches, and each of the operation buttons in the image portion on the right side, which are marked at the positions of the switches, are interlocked, as one for showing the name of the switch and one for showing the position of the switch corresponding thereto. When either of the operation buttons is touched, the linking to the screen for explaining how to operate the corresponding switch 23*a*, 23*b*, 23*c*, or 23*d* of the second layer, associated with the switch is established.

When the user touches a "wiper" button 31 among the operation buttons on the left side of the display screen of FIG. 3(A), the display color of the text "wiper" is changed to highlight that it is in the active state. At the same time, the entire inside of the mark of the "wiper" button 31 in the image portion on the right side is changed into red semitransparent color to highlight that it is in the active state. Thereafter, when a predetermined time passed (e.g., 2.0 seconds), the screen of the wiper 23*a* of the second layer of the equipment tree 19*a* is read from the screen collection 16, and is displayed on the display unit 17, as shown in FIG. 3(B).

FIG. 3(B) shows the screen for explaining how to operate the wiper 23*a*. As well as shown in FIG. 3(A), on the left side of the screen, texts for showing the names of the four switches are vertically displayed side by side, and the text "wiper" is highlighted in them. In the center of the screen, an illustration for showing the operations of the wiper switch is arranged for explanation. On the right side of the screen, an illustration for showing texts of the operations of the wiper switch and the operating states of the wiper corresponding to the operations in a table state is arranged. A "rear wiper" button 35 on the lower side of the screen is linked to the screen of a rear wiper 25*a* of a third layer of the equipment tree.

As shown in the center of FIG. 3(B), when the operation position of the wiper switch is operated vertically to each of five operation positions "MIST", "OFF", "INT", "LO", and "HI", the wiper becomes each of the operating states of "temporary operation", "stop", "intermittent operation", "low speed operation" and "high speed operation".

The illustration in the center of FIG. 3(B) includes illustrations for showing the five operation positions of the wiper switch. The illustrations are automatically changed and displayed one at a time at predetermined time intervals. By being interlocked with the change display of each of the illustrations, the line of the right illustration corresponding to the illustration is highlighted. For instance, when the illustration of the wiper switch is at the operation position "MIST", the color of the line "MIST/temporary operation" is changed for highlight. When the illustration is then moved to the operation position "OFF", the color of the line "MIST/temporary operation" is returned to the original color, so that the color of the line "OFF/stop" is changed for highlight.

According to this embodiment, even when the user cannot understand the position of the "wiper" switch, the user (driver) touches the name on the screen so that the user can immediately understand "the position of the wiper switch" of the driver's seat on the screen for displaying the same layout as the driver's seat. In addition, the user touches the mark for showing the position of the switch on the image so that the user can immediately understand what the switch is. Further, as the operation button shown by the name and the marked operation button are interlocked, the movement to the screen for explaining how to operate the switch of interest can be performed from either of them, so that the operation becomes very easy. Furthermore, an operation and the operating state from the result of the operation are displayed on the same screen at the same time and their illustrations are automatically changed one at a time, so that the visually associated operation positions can be easily understood.

In one embodiment, the operating states in the table are also informed by voice messages.

Returning to FIG. 3(A), the case of touching a "light" button 32 as the different operation button will be described. When the user touches the "light" button 32 on the display screen of FIG. 3(A), the display color of the text "light" is changed to highlight that it is in the active state. At the same time, the entire inside of the mark of the "light" button 32 in the image portion on the right side is changed into red semi-transparent color to highlight that it is in the active state. When a predetermined time passed (e.g., 2.0 seconds), the screen of the light 23b of the second layer of the equipment tree 19a is read from the screen collection 16, and is displayed on the display unit 17, as shown in FIG. 4(A).

Figure 4:
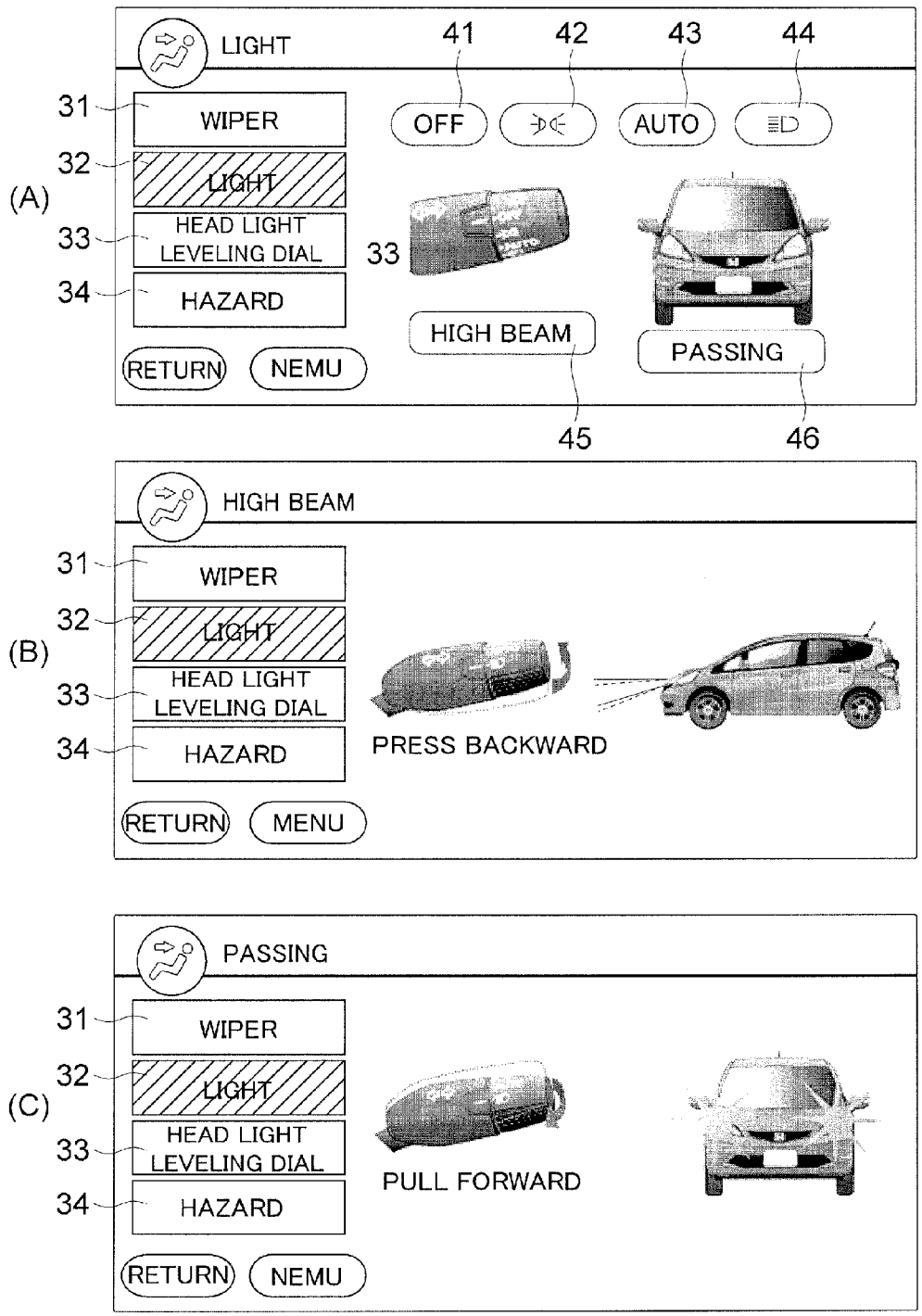
FIGS. 4(A), 4(B), and 4(C) are diagrams showing examples of the screens of the display unit according to the embodiment of the invention.

FIG. 4(A) shows the screen for explaining how to operate the light 23b. As well as shown in FIG. 3(A), on the left side of the screen, texts of the names of the four switches are vertically displayed side by side, and the text "light" is highlighted. On the upper side of the screen, an "OFF" button 41, a "small light on (character display)" button 42, an "AUTO (automatic point)" button 43, and a "head light on (character display) button 44 displayed for the light switch are arranged. In the center on the right side of the screen, an illustration for showing the operation positions of the light switch and a front view of the vehicle for showing the operating state of the vehicle by the operation of the switch are arranged. On the lower side of the screen, a "high beam" button 45 and a "passing" button 46 are arranged.

As shown in the illustration of the light switch in the center on the right side of FIG. 4(A), the four texts and characters are displayed for the light switch. When the light switch is rotated so as to be matched with each of the operation positions of the four texts and characters, the light in the front view of the vehicle becomes each of the operating states "OFF", "small light on", "AUTO (automatic point)", and "head light on".

The operation for rotationally displaying the illustration of the light switch is performed by touching any one of the four buttons 41 to 44 on the upper side of FIG. 4(A). When any one of the buttons 41 to 44 is touched, the illustration display in the center on the right side of FIG. 4(A) is changed to the illustration for showing the operation position of the light switch and the front view for showing the operating state of the vehicle, corresponding to the touched button. For instance, when the "small light on" button 42 is touched, the color of the "small light on" button 42 is changed for highlight. Thereby switching to the illustration in which the light switch in the image is changed so that it is rotated to the operation position "small light on" and to the illustration in which the vehicle in the image is changed so that the small light is turned on are performed.

When the "AUTO" button 43 is touched, the color of the "AUTO" button 43 is changed for highlight. Thereby switching to the illustration in which the operation switch in the image is changed so that it is rotated to the operation position "AUTO" and to the illustration in which the vehicle in the image is changed so that the small light and the head light are turned on are performed. And the message "when it gets dark, the small light and the head light are automatically turned on" is repeated by voice message. Likewise, for each of the "OFF" button 41 and the "head light on (character display)" button 44, the switching to the illustration in which the operation switch in the image is rotated and to the illustration showing the operating state of the vehicle are performed.

According to this embodiment, the operating state corresponding to the operation position of the operation switch is displayed so as to coincide with the illustration of the actual vehicle, which can be easily understood, and understanding in bodily sensation manner can be promoted.

Next, the "high beam" button 45 and the "passing" button 46 arranged on the lower side of the screen of FIG. 4(A) is described. The "high beam" button 45 and the "passing" button 46 are linked to the screens of a high beam 25b and a passing 25c of the third layer, respectively.

When the user touches the "high beam" button 45, the screen of the high beam 25b of the third layer of the equipment tree 19a is read from the screen collection 16, and is displayed on the display unit 17, as shown in FIG. 4(B).

FIG. 4(B) shows the screen for explaining how to operate the high beam 25b. As well as shown in FIG. 4(A), on the left side of the screen, texts of the names of the four switches are vertically displayed side by side. An illustration for showing the operations of the light switch and a side view of the vehicle are arranged from the center to the right side of the screen.

When the operation position of the light switch is operated so as to be pressed backward, the light becomes the high beam operating state. When the operation position of the light switch is operated so as to be returned forward, the light becomes the low beam operating state.

In the illustration for showing the operations of the light switch in the center of the screen of FIG. 4(B), the illustration in which the operation position of the light switch is pressed backward and the illustration in which the operation position of the light switch is returned forward are automatically changed and displayed one at a time at predetermined time intervals. By being interlocked with the change display of the illustration, the vehicle illustration on the right side of the screen is displayed so that the illumination range of the head light of the vehicle is changed upward or downward.

According to this embodiment, although an actual operating state with the upward or downward change of the above illumination range, which has a large influence on oncoming vehicles or persons, tends to be difficult to be directly grasped at the driver's seat. However, the upward or downward operation of the illumination range (optical axis) is shown in the actual vehicle illustration, so that understanding in simulation bodily sensation manner can be deepened.

Returning to FIG. 4(A), the "passing" button 46 is described. When the user touches the "passing" button 46, the screen of the high beam 25c of the third layer of the equipment tree 19a is read from the screen collection 16, and is displayed on the display unit 17, as shown in FIG. 4(C).

FIG. 4(C) shows the screen for explaining how to operate the passing 25c. As well as shown in FIG. 4(A), on the left side of the screen, texts of the names of the four switches are vertically displayed side by side. From the center to the right side of the screen, an illustration for showing the operations of the passing and a front view of the vehicle are arranged.

When the operation position of the light switch is operated so as to be pulled forward, the light becomes the operating state of passing. When the operation position of the light switch is operated so as to be returned backward, it is becomes the operating state in which the light is turned off.

The illustration for showing the operations of the light switch in the center of the screen of FIG. 4(C), the illustration in which the operation position of the light switch is pulled forward and the illustration in which the operation position of the light switch is returned backward are automatically changed and displayed one at a time at predetermined time intervals. By being interlocked with the change display of the illustration, the vehicle illustration on the right side of the screen is displayed so that the head light of the vehicle is changed to the operating state in which it is turned on or the operating state in which it is turned off.

Returning to FIG. 3(A), the case of touching a "head light leveling dial" button 33 is described. When the user touches the "head light leveling dial" button 33, the screen of the head light leveling dial 23c of the second layer of the equipment tree 19a is read from the screen collection 16, and is displayed on the display unit 17, as shown in FIG. 5(A).

As well as shown in FIG. 3(A), on the left side of the screen, texts showing the names of the four switches are vertically displayed side by side. The text "head light leveling dial" is highlighted in them. An illustration for showing the operations of the leveling and a side view of the vehicle are arranged from the center to the right side of the screen.

When the operation position of the leveling dial is operated so as to be rotated upward or downward, the head light becomes the operating state in which the illumination range (the height of the optical axis) is upward or into the operating state in which the illumination range is downward.

Figure 5:
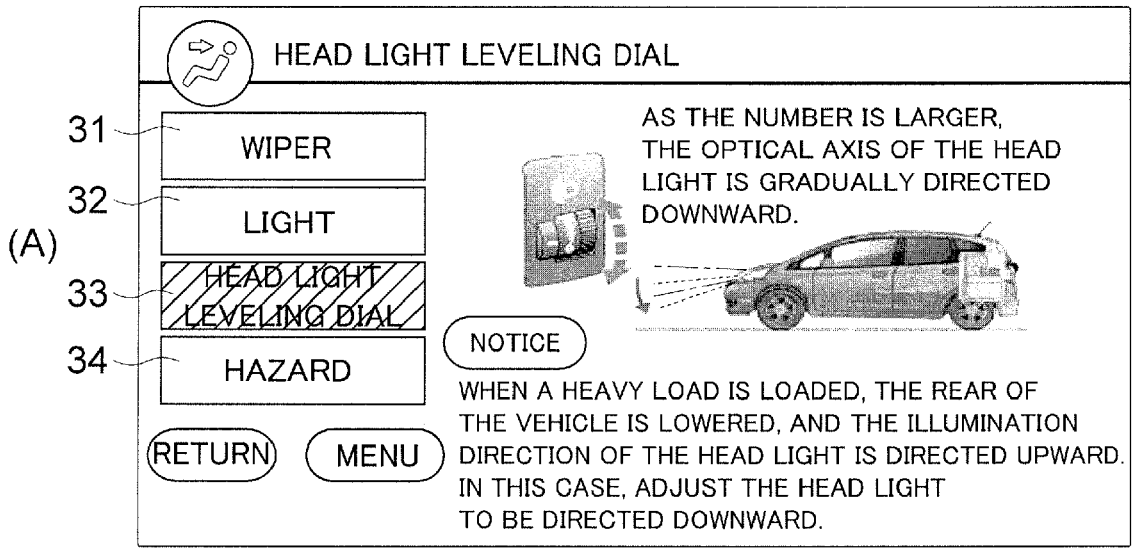
FIGS. 5(A) and 5(B) are diagrams showing examples of the screens of the display unit according to the embodiment of the invention.
Figure 5:
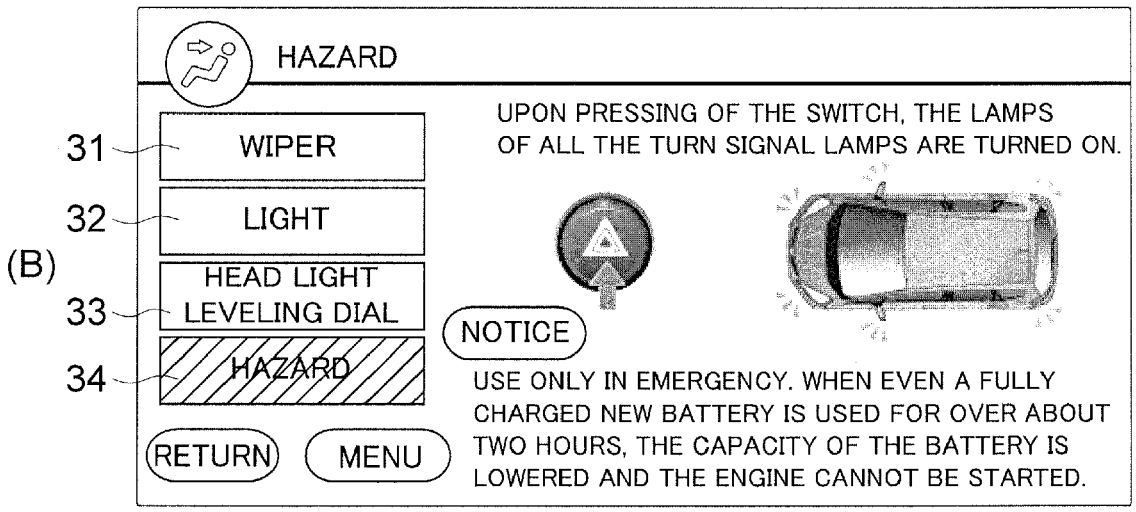

In the illustration in the center of the screen of FIG. 5(A), a plurality of illustrations in which the operation position of the leveling dial is moved upward or in which the operation position of the leveling dial is moved downward are automatically changed and displayed one at a time at very short time intervals, and are displayed in moving image state. By being interlocked with the change display of the illustration, the vehicle illustration on the right side of the screen is displayed in moving image state so that the illumination range of the head light of the vehicle is continuously changed upward or downward.

According to this embodiment, when the leveling dial is rotated, it is possible to understand at a glance that the illumination range (optical axis) is continuously upward or downward.

According to an embodiment, a main point that in what case this function is performed is displayed by text on the screen, and is also explained by a voice message.

Returning to FIG. 3(A), the case of touching a "hazard" button 34 is described. When the user touches the "hazard" button 34, the screen of the hazard 23d of the second layer of the equipment tree 19a is read from the screen collection 16, and is displayed on the display unit 17, as shown in FIG. 5(B).

As well as shown in FIG. 3(A), on the left side of the screen, texts showing the names of the four switches are vertically displayed side by side, and the text "hazard" is highlighted in them. From the center to the right side of the screen, an illustration for showing the operations of the hazard and a plan view of the vehicle are arranged.

When the operation position of the hazard switch is operated so as to be turned on (the state that it is pressed backward), the hazard switch becomes the operating state in which all the turn signal lamps are flashed. When the operation position of the hazard switch is operated so as to be turned off (the state that it is returned), the hazard switch becomes the operating state in which all the turn signal lamps are turned off.

In the illustration in the center of the screen of FIG. 5(B), the illustration in which the hazard switch is at the ON operation position and the illustration in which the hazard switch is at the OFF operation position are automatically changed and displayed one at a time at predetermined time intervals. By being interlocked with the change display to the ON operation position of the illustration, the vehicle illustration on the right side of the screen is changed to the flashing operating state in which the turn signal lamps of the vehicle are alternately turned on and off. The flashing operating state in this case includes the alternate display of the illustration in which the turn signal lamps are turned on and the illustration in which the turn signal lamps are turned off.

In this embodiment, the operation of selecting each of the switches "wiper", "light", "head light leveling dial", and "hazard" from the menu screen of FIG. 3(A) has been described. The selective operation from any one of other buttons displayed on the left side of the screen for explaining the buttons is also enabled.

In addition, the state of the voice guide provided to the portion in which an effect is particularly high has been described, but the voice guide is preferably provided to the explanation of other portions, if necessary.

The invention has been described above with reference to the specific embodiment, but the invention is not limited to such embodiment.

The invention claimed is:

1. An electronic manual display device which is a program-controlled display device for displaying an electronic manual for operating a vehicle using an on-vehicle navigation system having a storage device and a display unit, wherein when a button for requiring the explanation of the switches is selected from the menu screen of the electronic manual, the display device reads out a screen for explaining how to operate the switches from the storage device, and displays the screen on the display unit, wherein the screen is linked to the selected button, wherein on the screen for explaining how to operate the switches, an illustration for explaining the operation positions of the switches and an illustration for showing the operating state of the vehicle obtained at the operation positions of the switches are displayed side by side, and the illustration for showing the operating state of the vehicle changes simultaneously to an illustration for showing the operating state of the vehicle obtained at the changed operation positions corresponding to a change in the illustration for explaining the operation positions of the switches.

2. The electronic manual display device according to claim 1, further comprising:

means for reading out an image in a visibility region in the vehicle seen from a driver's seat, from the storage device, when a button for requiring the explanation of the switches is selected from the menu screen of the electronic manual and including the switches, and the means displaying the image and the operation buttons for showing the names of the switches on the display unit, the operation buttons being linked to the selected button, wherein the image shows marks at the positions of the switches respectively, wherein the operation buttons showing the names of the switches are aligned and arranged so as not to be overlapped with the image, wherein when the mark or the operation button for showing the name of the switch is selected, after both of the selected mark and the operation button for showing the name of the switch corresponding to the mark are highlighted, a screen for explaining how to operate the switch is read out from the storage device and is displayed on the display unit, wherein the screen is linked to the selected mark or the operation button for showing the name of the switch.

3. The display device according to claim 1, wherein on the screen for explaining how to operate the switches, a plurality of operation positions of each of the switches are sequentially changed and displayed at predetermined time intervals.

4. The display device according to claim 1, wherein on the screen for explaining how to operate the switches, the continuous operation positions of each of the switches are continuously changed and displayed at short time intervals.

5. The display device according to claim 1, wherein the display unit is a touch panel display unit, and the selection is performed by touching the screen of the display unit.

* * * * *